United States Patent
Aston et al.

(10) Patent No.: US 11,286,066 B2
(45) Date of Patent: Mar. 29, 2022

(54) MULTIPLE SPACE VEHICLE LAUNCH SYSTEM

(71) Applicant: The Boeing Company, Chicago, IL (US)

(72) Inventors: Richard W. Aston, Brea, CA (US); Anna M. Tomzynska, Seal Beach, CA (US); Glenn N. Caplin, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 803 days.

(21) Appl. No.: 15/920,284

(22) Filed: Mar. 13, 2018

(65) Prior Publication Data
US 2018/0201396 A1 Jul. 19, 2018

Related U.S. Application Data

(63) Continuation of application No. 14/925,152, filed on Oct. 28, 2015, now Pat. No. 9,957,068, which is a
(Continued)

(51) Int. Cl.
*B64G 1/64* (2006.01)
*B64G 1/00* (2006.01)
*B64G 1/40* (2006.01)

(52) U.S. Cl.
CPC ............ *B64G 1/641* (2013.01); *B64G 1/002* (2013.01); *B64G 1/40* (2013.01); *B64G 1/405* (2013.01); *B64G 1/645* (2013.01)

(58) Field of Classification Search
CPC ........ B64G 1/641; B64G 1/002; B64G 1/402; B64G 1/645; B64G 1/44; B64G 1/401;
(Continued)

(56) References Cited

U.S. PATENT DOCUMENTS 3,145,531 A 8/1964 Deutsch
3,420,470 A * 1/1969 Meyer .................... B64G 1/645
244/173.3
(Continued)

FOREIGN PATENT DOCUMENTS

CN 1131291 9/1996
CN 1172751 2/1998
(Continued)

OTHER PUBLICATIONS

Intellectual Property Office of China, "Notification of the Decision of Rejection," issued in connection with application No. 201610239117. 4, dated Jun. 4, 2018, 6 pages.
(Continued)

*Primary Examiner* — Medhat Badawi
(74) *Attorney, Agent, or Firm* — Hanley, Flight & Zimmerman, LLC

(57) ABSTRACT

A space vehicle system, a method of manufacturing a multiple space vehicle launch system, and a method to transmit a launch load between space vehicles during a launch are disclosed. The space vehicle system may include a first space vehicle including a first core structure, a second space vehicle including a second core structure releasably attached to the first space vehicle in a stacked configuration, a first solar array supported by the first core structure, the first core structure extending beyond a lower edge of the first solar array, and a second solar array supported by the second core structure, the second core structure extending beyond an upper edge of the second solar array.

28 Claims, 3 Drawing Sheets

Related U.S. Application Data continuation of application No. 14/486,103, filed on Sep. 15, 2014, now Pat. No. 9,394,065, which is a continuation of application No. 13/604,050, filed on Sep. 5, 2012, now Pat. No. 8,915,472.

(60) Provisional application No. 61/646,222, filed on May 11, 2012.

(58) Field of Classification Search
CPC ... B64G 1/14; B64G 1/66; B64G 1/26; B64G 1/22; B64G 2001/643; B64G 1/40; B64G 1/405; B64G 1/242; B64G 1/1085
See application file for complete search history.

(56) References Cited

U.S. PATENT DOCUMENTS

| | | | | |
|---|---|---|---|---|
| 3,929,306 | A | 12/1975 | Faget et al. | |
| 4,009,851 | A * | 3/1977 | Cable | B64G 1/10 244/173.1 |
| 4,345,861 | A | 8/1982 | Aarseth | |
| 4,682,744 | A | 7/1987 | Gounder | |
| 4,829,784 | A | 5/1989 | Berg et al. | |
| 4,896,848 | A * | 1/1990 | Ballard | B64G 1/007 244/171.3 |
| 5,052,640 | A * | 10/1991 | Chang | B64G 1/002 136/292 |
| 5,152,482 | A * | 10/1992 | Perkins | B64G 1/22 244/159.4 |
| 5,199,672 | A * | 4/1993 | King | B64G 1/007 244/164 |
| 5,271,582 | A * | 12/1993 | Perkins | B64G 1/22 244/159.4 |
| 5,314,146 | A * | 5/1994 | Chicoine | B64G 1/10 244/159.4 |
| 5,350,137 | A * | 9/1994 | Henley | B64G 1/1085 244/158.1 |
| 5,351,746 | A | 10/1994 | Mackey et al. | |
| 5,383,631 | A | 1/1995 | Mazzini | |
| 5,386,953 | A * | 2/1995 | Stuart | B64G 1/1085 244/158.4 |
| 5,397,082 | A * | 3/1995 | Scott | B64G 1/105 244/158.4 |
| 5,411,226 | A * | 5/1995 | Jones | B64G 1/1085 244/173.3 |
| 5,522,569 | A * | 6/1996 | Steffy | B64G 1/641 244/158.1 |
| 5,527,001 | A * | 6/1996 | Stuart | B64G 1/66 244/159.4 |
| 5,529,264 | A * | 6/1996 | Bedegrew | B64F 1/04 102/274 |
| 5,595,360 | A * | 1/1997 | Spitzer | B64G 1/007 244/158.5 |
| 5,604,430 | A | 2/1997 | Decker et al. | |
| 5,605,308 | A * | 2/1997 | Quan | B64G 1/641 102/489 |
| 5,613,653 | A * | 3/1997 | Bombled | B64G 1/641 244/173.1 |
| 5,647,561 | A * | 7/1997 | Robinson | B64G 1/641 244/173.1 |
| 5,716,029 | A | 2/1998 | Spitzer et al. | |
| 5,743,492 | A * | 4/1998 | Chan | B64F 1/04 102/274 |
| 5,755,406 | A * | 5/1998 | Aston | B64G 1/1007 244/159.4 |
| 5,765,780 | A * | 6/1998 | Barskey | B64G 1/28 244/165 |
| 5,765,784 | A * | 6/1998 | Lapins | B64G 1/105 244/173.3 |
| 5,779,195 | A * | 7/1998 | Basuthakur | B64G 1/007 244/173.1 |
| 5,806,800 | A * | 9/1998 | Caplin | B64G 1/503 165/41 |
| 5,823,476 | A * | 10/1998 | Caplin | B64G 1/428 244/158.1 |
| 5,833,175 | A * | 11/1998 | Caplin | B64G 1/10 244/158.1 |
| 5,848,767 | A * | 12/1998 | Cappa | B64G 1/10 244/158.1 |
| 5,884,866 | A * | 3/1999 | Steinmeyer | B64G 1/002 244/137.1 |
| 5,947,421 | A | 9/1999 | Beattie et al. | |
| 5,961,738 | A * | 10/1999 | Benton | B64G 1/44 136/245 |
| 5,976,833 | A * | 11/1999 | Furukawa | C12N 5/00 435/243 |
| 5,979,833 | A * | 11/1999 | Eller | B64G 1/10 244/159.4 |
| 5,984,235 | A * | 11/1999 | Snowhook | B64G 1/007 244/171.3 |
| 5,984,236 | A | 11/1999 | Keitel et al. | |
| 6,032,904 | A | 3/2000 | Hosick et al. | |
| 6,061,562 | A * | 5/2000 | Martin | H01Q 3/242 455/431 |
| 6,121,569 | A * | 9/2000 | Miley | H05H 1/54 219/121.36 |
| 6,135,394 | A | 10/2000 | Kamel et al. | |
| 6,138,951 | A * | 10/2000 | Budris | B64G 1/002 102/393 |
| 6,193,187 | B1 * | 2/2001 | Scott | B64G 1/14 244/159.3 |
| 6,193,193 | B1 * | 2/2001 | Soranno | B64G 1/007 244/159.4 |
| 6,206,327 | B1 * | 3/2001 | Benedetti | B64G 1/10 244/159.4 |
| 6,227,493 | B1 * | 5/2001 | Holemans | B64G 1/641 244/173.1 |
| 6,237,876 | B1 * | 5/2001 | Barker | B64G 1/007 244/164 |
| 6,260,805 | B1 | 7/2001 | Yocum, Jr. et al. | |
| 6,267,330 | B1 | 7/2001 | Cochran | |
| 6,296,206 | B1 * | 10/2001 | Chamness | B64G 1/00 244/173.3 |
| 6,341,749 | B1 | 1/2002 | Ocampo | |
| 6,343,770 | B2 | 2/2002 | Holemans | |
| 6,357,698 | B1 * | 3/2002 | DiVerde | B64G 1/002 244/173.3 |
| 6,357,699 | B1 | 3/2002 | Edberg et al. | |
| 6,390,416 | B2 | 5/2002 | Holemans | |
| 6,402,091 | B1 | 6/2002 | Hansen | |
| 6,454,214 | B1 * | 9/2002 | Smith | B64G 1/641 102/377 |
| 6,494,406 | B1 * | 12/2002 | Fukushima | B64G 1/002 244/173.3 |
| 6,536,712 | B1 * | 3/2003 | Barenett | B64G 1/10 244/158.3 |
| 6,543,723 | B1 | 4/2003 | Oh | |
| 6,543,724 | B1 * | 4/2003 | Barnett | B64G 1/222 244/172.6 |
| 6,565,043 | B1 | 5/2003 | Wittmann | |
| 6,581,880 | B2 | 6/2003 | Randolph et al. | |
| 6,637,701 | B1 | 10/2003 | Glogowski et al. | |
| 6,739,555 | B2 | 5/2004 | Mazanek et al. | |
| 6,789,767 | B2 | 9/2004 | Mueller et al. | |
| 6,845,950 | B1 | 1/2005 | Goodzeit et al. | |
| 7,059,571 | B2 | 6/2006 | Kellberg | |
| 7,109,748 | B1 * | 9/2006 | Liu | H03K 19/0016 326/113 |
| 7,113,851 | B1 * | 9/2006 | Gelon | B64G 1/007 701/13 |
| 7,114,683 | B2 * | 10/2006 | Hall | B64G 1/002 244/173.1 |
| 7,138,960 | B2 * | 11/2006 | Carroll | H01Q 1/288 343/882 |
| 7,216,833 | B2 | 5/2007 | D'Ausilio et al. | |
| 7,216,834 | B2 | 5/2007 | D'Ausilio et al. | |
| 7,219,858 | B2 | 5/2007 | Sharer | |
| 7,388,559 | B1 * | 6/2008 | Kim | H01Q 1/288 343/781 P |

(56) References Cited

U.S. PATENT DOCUMENTS

| | | | |
|---|---|---|---|
| 7,400,096 B1* | 7/2008 | Foster | H01J 27/18 156/345.36 |
| 7,493,869 B1* | 2/2009 | Foster | H01J 27/18 118/723 AN |
| 7,658,414 B2 | 2/2010 | Watanabe et al. | |
| 7,686,255 B2 | 3/2010 | Harris | |
| 7,823,837 B2 | 11/2010 | Behrens et al. | |
| 7,861,975 B2 | 1/2011 | Behrens et al. | |
| 7,905,453 B2 | 3/2011 | Benedict et al. | |
| 7,931,237 B2* | 4/2011 | Penzo | F42B 15/10 244/173.1 |
| 8,006,938 B2 | 8/2011 | Behrens et al. | |
| 8,016,240 B2 | 9/2011 | Caplin et al. | |
| 8,136,765 B2 | 3/2012 | Geneste et al. | |
| 8,152,108 B2 | 4/2012 | Becker-Irvin et al. | |
| 8,196,868 B2 | 6/2012 | Kutter et al. | |
| 8,281,697 B2 | 10/2012 | McCants, Jr. | |
| 8,393,582 B1 | 3/2013 | Kutter et al. | |
| 8,499,874 B2* | 8/2013 | Dewis | F02C 6/16 180/165 |
| 8,511,617 B2 | 8/2013 | Caplin et al. | |
| 8,789,797 B2 | 7/2014 | Darooka | |
| 8,915,472 B2 | 12/2014 | Aston et al. | |
| 8,973,873 B2 | 3/2015 | Aston et al. | |
| 9,027,889 B2* | 5/2015 | Aston | B64G 1/1085 244/173.1 |
| 9,108,748 B2 | 8/2015 | Munir et al. | |
| 9,108,749 B2 | 8/2015 | Woo et al. | |
| 9,180,984 B2 | 11/2015 | Peterka, III et al. | |
| 9,394,065 B2 | 7/2016 | Aston et al. | |
| 10,351,268 B2* | 7/2019 | Estevez | B64G 1/1085 |
| 10,442,557 B2* | 10/2019 | Faye | B64G 1/10 |
| 10,689,133 B2* | 6/2020 | Cheynet de Beaupre | B64G 1/26 |
| 2002/0000495 A1* | 1/2002 | Diverde | B64G 1/002 244/137.1 |
| 2002/0102130 A1* | 8/2002 | Nygren | B64G 1/645 403/337 |
| 2002/0179775 A1 | 12/2002 | Turner | |
| 2002/0179776 A1 | 12/2002 | Mueller et al. | |
| 2003/0075645 A1 | 4/2003 | Randolph et al. | |
| 2003/0136881 A1* | 7/2003 | Beyer | B64G 1/002 244/158.1 |
| 2003/0150958 A1* | 8/2003 | Herbert | B64G 1/10 244/159.4 |
| 2004/0164205 A1* | 8/2004 | Kellberg | B64G 1/405 244/171.1 |
| 2005/0109878 A1* | 5/2005 | Cruijssen | B64G 1/641 244/173.1 |
| 2006/0016934 A1* | 1/2006 | Sharer | B64G 1/007 244/158.4 |
| 2006/0168936 A1* | 8/2006 | Rooney | F03H 1/0012 60/202 |
| 2006/0278765 A1* | 12/2006 | Strack | B64G 1/646 244/172.4 |
| 2007/0023579 A1* | 2/2007 | Wang | B64G 1/44 244/158.6 |
| 2007/0029446 A1* | 2/2007 | Mosher | B64G 1/10 244/158.1 |
| 2007/0125910 A1* | 6/2007 | Cepollina | B64G 1/1078 244/172.6 |
| 2007/0228219 A1* | 10/2007 | Behrens | B64G 1/646 244/172.5 |
| 2007/0228220 A1* | 10/2007 | Behrens | B64G 1/1078 244/172.5 |
| 2008/0078886 A1* | 4/2008 | Foster | B64G 1/1078 244/173.1 |
| 2008/0149776 A1* | 6/2008 | Benedict | B64G 1/641 244/158.1 |
| 2008/0149777 A1* | 6/2008 | Benedict | B64G 1/641 244/158.1 |
| 2008/0155610 A1* | 6/2008 | Rosen | H04B 7/18523 725/64 |
| 2008/0237399 A1* | 10/2008 | Caplin | B64G 1/1085 244/158.4 |
| 2008/0265098 A1* | 10/2008 | Connelly | B64G 1/1078 244/158.1 |
| 2009/0057492 A1 | 3/2009 | Harris | |
| 2009/0101757 A1 | 4/2009 | Brandhorst, Jr. | |
| 2009/0108139 A1* | 4/2009 | Duden | B64G 1/641 244/173.3 |
| 2009/0127399 A1* | 5/2009 | Mueller | B64G 1/62 244/159.1 |
| 2009/0224105 A1 | 9/2009 | Caplin et al. | |
| 2010/0176248 A1* | 7/2010 | Terziakin | B64G 1/409 244/171.3 |
| 2010/0264275 A1 | 10/2010 | Behruzi et al. | |
| 2011/0031352 A1 | 2/2011 | Behrens et al. | |
| 2011/0097995 A1* | 4/2011 | Caplin | H04B 7/18513 455/12.1 |
| 2011/0139936 A1* | 6/2011 | Allen | B64G 1/222 244/158.2 |
| 2011/0210208 A1* | 9/2011 | Ganguli | B64G 1/1078 244/158.1 |
| 2012/0012711 A1* | 1/2012 | Ross | B64G 1/641 244/158.2 |
| 2012/0097796 A1* | 4/2012 | Munir | B64G 1/007 244/158.6 |
| 2012/0097797 A1* | 4/2012 | Woo | B64G 1/26 244/158.6 |
| 2012/0210852 A1* | 8/2012 | McCants, Jr. | B64D 1/04 89/1.8 |
| 2012/0227374 A1* | 9/2012 | Zegler | B64G 1/402 60/204 |
| 2012/0300071 A1* | 11/2012 | Do Carmo Miranda | B64G 1/222 348/144 |
| 2013/0099059 A1* | 4/2013 | Cheynet De Beaupre | B64G 1/10 244/158.1 |
| 2013/0221162 A1* | 8/2013 | Darooka | B64G 1/10 244/173.1 |
| 2013/0299641 A1* | 11/2013 | Aston | B64G 1/405 244/171.1 |
| 2014/0061386 A1* | 3/2014 | Peterka, III | B64G 1/641 244/171.5 |
| 2014/0103164 A1 | 4/2014 | Aston et al. | |
| 2014/0239125 A1* | 8/2014 | Aston | B64G 1/402 244/172.3 |
| 2015/0001348 A1 | 1/2015 | Aston et al. | |
| 2015/0028159 A1* | 1/2015 | Vichnin | B64G 1/002 244/172.8 |
| 2016/0046397 A1 | 2/2016 | Aston et al. | |
| 2017/0297747 A1* | 10/2017 | Peterka, III | B64G 1/002 |

FOREIGN PATENT DOCUMENTS

| | | |
|---|---|---|
| CN | 101381003 | 3/2009 |
| CN | 102767497 A | 11/2012 |
| CN | 103448919 | 12/2013 |
| EP | 937644 | 8/1999 |
| EP | 1013546 | 6/2000 |
| EP | 2662287 | 11/2013 |
| EP | 2662289 | 11/2013 |
| JP | S6250299 | 3/1987 |
| JP | 03193597 | 8/1991 |
| JP | H6-191500 | 7/1994 |
| JP | 07-089499 | 4/1995 |
| JP | H19277997 | 10/1997 |
| JP | H111291998 | 10/1999 |
| JP | 2000168697 | 6/2000 |
| JP | 2003291898 | 10/2003 |
| JP | 2010537880 | 12/2010 |
| RU | 2040448 | 7/1995 |
| RU | 2124461 | 1/1999 |
| RU | 2233772 | 8/2004 |
| RU | 2246035 | 5/2005 |
| RU | 59749 | 12/2006 |
| RU | 2328616 | 7/2008 |

(56) References Cited

FOREIGN PATENT DOCUMENTS

| WO | 156883 | 8/2001 |
|---|---|---|
| WO | 2005118394 | 12/2005 |
| WO | 2009048678 | 4/2009 |

OTHER PUBLICATIONS

Boards of Appeal of the European Patent Office, "Summons to Oral Proceedings", in Appeal No. T1093/18-3.2.01, for European Patent Application No. 13167339.4/2662287, dated Nov. 30, 2018,11 pages.
European Patent Office, "Extended European Search Report," issued in connection with patent application No. 19185335.7 dated Nov. 12, 2019, 10 pages.
Baturin, Y.M., "The Worldwide piloted Space: Science. History. Technology," RT soft, Moscow, 2005, pp. 98, 104, and 105, 3 pages.
"Boeing 702 Fleet," Jun., 2005, retrieved from [http://www.apcon.aero/news/boeing702.pdf], 5 pages.
Clark, "Two broadcasting satellites share Proton rocket ride," web page of Spaceflight Now, Jul. 15, 2011, retrieved Mar. 16, 2018, from [http://www.spaceflightnow.com/proton/ses3/], 4 pages.
Chinese Patent Office, "Notification of First Office Action," issued in connection with Chinese Patent Application No. 201310170861.X, dated Jun. 17, 2015, 10 pages.
Chinese Patent Office, "First Office Action and Search Report," issued in connection with Chinese Patent Application No. 201610239117.4, dated Jun. 7, 2017, 19 pages.
Credland, J.; "The Cluster Mission—ESA's Space Fleet to the Magnetosphere," The Cluster Mission, ESA Bulletin No. 84, pp. 113-137, Nov. 1995, 14 pages.
Duchemin et al., "Electric Propulsion Thruster Assembly for Small GEO—Status Update," IEPC-2011-167, Presented at the 32nd International Electric Propulsion Conference, pp. 1-9, Sep. 11-15, 2011, 9 pages.
European Patent Office, "Examination Report," issued in connection with European Patent Application No. 13167339.4, dated Apr. 6, 2016, 5 pages.
European Patent Office, "Communication pursuant to Article 94(3) EPC," issued in connection with European Patent Application No. 13167339.4, dated Nov. 16, 2016, 6 pages.
European Patent Office, "Communication pursuant to Rule 114(2) EPC, Third Party Observation," issued in connection with European Patent Application No. 13167339.4, dated Dec. 22, 2016, 4 pages.
European Patent Office, "Brief Communication," issued in connection with European Patent Application No. 13167339.4, dated May 12, 2017, 1 page.
European Patent Office, "Refusal Decision," issued in connection with European Patent Application No. 13167339.4, dated Nov. 14, 2017, 35 pages.
European Patent Office, "Examination Report," issued in connection with European Patent Application No. 13167339.4, dated Sep. 1, 2015, 5 pages.
European Patent Office, "Search Report," issued in connection with European Patent Application No. 13167339.4, dated Sep. 26, 2013, 7 pages.
Gianolio, Alberto, "LISA—Laser Interferometer Space Antenna," EESA, Feb. 3, 2011, 8 pages.
Gibbons et al., "Packaging Multiple Small Satellites on a Single Launch Vehicle," Sep. 1989, 14 pages.
Johann et al., "The European Space Agency's LISA Mission Study: Status and Present Results," 7th Edoardo Amaldi Conference on Gravitational Waves, Journal of Physics, Conference Series 122, doi: 10.1088/1742-6596/122/1/012005, 2008, 9 pages.
Mailhe et al., "Design of a Hybrid Chemical/Electric Propulsion Orbital Transfer Vehicle," Journal of Spacecraft and Rockets, vol. 39, No. 1, Jan. 2002, pp. 131-139, 9 pages.
Mecke, G., "The Cluster Spacecraft: A unique Production Line," XP 000582980, 2531 ESA Bulletin, No. 84, Nov. 1995, pp. 118-129, 12 pages.
Merkowitz et al., "LISA Propulsion module separation study," Institute of Physics Publishing, Class. Quantum Gray. 22, doi: 10.1088/0264-9381/22/10/037; S413-S419, 2005, pp. 1-7, 7 pages.
Owano, N., "All-electric propulsion satellite by Boeing now fully operational," Tech Xplore, Sep. 2015, retrieved on Nov. 22, 2015, from [http://techxplore.com/news/2015-09-all-electric-propulsion-satellite-boeing-fully.html], 2 pages.
Porte et al., "Benefits of Electric Propulsion for Orbit Injection of Communication Spacecraft," International Communication Satellite Systems Conference and Exhibit, pp. 1-9, Mar. 22, 1992.
Fuchs, "Small GEO, A Product for the Market," 5th Capital Market Day, OHB System, Feb. 11, 2009, pp. 1-19, 19 pages.
Russian Patent Office, "Search Report," issued in connection with Russian Patent Application No. 201300451, dated Aug. 6, 2013, 3 pages.
The Cluster II Project Team, "The Cluster-II Mission—Rising from the Ashes," Cluster-II, ESA Bulletin No. 102, May, 2000, pp. 47-53.
United States Patent and Trademark Office, "Non-Final Office Action," issued in connection with U.S. Appl. No. 13/604,050, dated Feb. 14, 2014, 14 pages.
United States Patent and Trademark Office, "Notice of Allowance," issued in connection with U.S. Appl. No. 13/604,050, dated May 20, 2014, 5 pages.
United States Patent and Trademark Office, "Notice of Allowance," issued in connection with U.S. Appl. No. 14/486,103, dated Jan. 23, 2015, 12 pages.
United States Patent and Trademark Office, "Non-Final Office Action," issued in connection with U.S. Appl. No. 14/486,103, dated May 13, 2015, 17 pages.
United States Patent and Trademark Office, "Notice of Allowance," issued in connection with U.S. Appl. No. 14/486,103, dated Sep. 1, 2015, 9 pages.
United States Patent and Trademark Office, "Notice of Allowance," issued in connection with U.S. Appl. No. 14/486,103, dated Dec. 9, 2015, 15 pages.
United States Patent and Trademark Office, "Non-Final Office Action," issued in connection with U.S. Appl. No. 14/925,152, dated Mar. 10, 2016, 30 pages.
United States Patent and Trademark Office, "Non-Final Office Action," issued in connection with U.S. Appl. No. 14/925,152, dated Feb. 14, 2017, 15 pages.
United States Patent and Trademark Office, "Notice of Allowance," issued in connection with U.S. Appl. No. 14/925,152, dated May 31, 2017, 5 pages.
United States Patent and Trademark Office, "Supplemental Notice of Allowability," issued in connection with U.S. Appl. No. 14/925,152, dated Jun. 5, 2017, 4 pages.
United States Patent and Trademark Office, "Notice of Allowance," issued in connection with U.S. Appl. No. 14/925,152, dated Aug. 31, 2017, 5 pages.
United States Patent and Trademark Office, "Notice of Allowance," issued in connection with U.S. Appl. No. 14/925,152, dated Dec. 13, 2017, 5 pages.
United States Patent and Trademark Office, "Supplemental Notice of Allowability," issued in connection with U.S. Appl. No. 14/486,103, dated Apr. 27, 2016, 2 pages.
United States Patent and Trademark Office, "Notice of Allowance," issued in connection with U.S. Appl. No. 14/486,103, dated Mar. 21, 2016, 5 pages.
United States Patent and Trademark Office, "Notice of Allowance," issued in connection with U.S. Appl. No. 14/925,152, dated Jun. 24, 2016, 5 pages.
United States Patent and Trademark Office, "Notice of Allowance," issued in connection with U.S. Appl. No. 14/925,152, dated Oct. 24, 2016, 5 pages.
Valentian et al., "SPT sizing for integrated propulsion systems," AIAA, ASME, SAE, and ASEE, Joint Propulsion Conference and Exhibit, 32nd, Lake Buena Vista, FL, Jul. 1-3, 1996, American Institute of Aeronautics and Astronautics, Inc., 8 pages.
United States Patent and Trademark Office, "Non-final Office Action," issued in connection with U.S. Appl. No. 13/652,101, dated Apr. 11, 2014, 21 pages.

(56) References Cited

OTHER PUBLICATIONS

United States Patent and Trademark Office, "Notice of Allowance," issued in connection with U.S. Appl. No. 13/652,101, dated Oct. 17, 2014, 15 pages.
Spaceflight Now, "Two Broadcasting Satellites Share Proton Rocket Ride," Jul. 15, 2011, [http://www.spaceflightnow.com/proton/ses3/], retrieved on Aug. 17, 2015, 4 pages.
United States Patent and Trademark Office, "Non-final Office Action," issued in connection with U.S. Appl. No. 13/693,694, dated Nov. 5, 2014, 20 pages.
United States Patent and Trademark Office, "Final Office Action," issued in connection with U.S. Appl. No. 13/693,694, dated Feb. 25, 2015, 17 pages.
United States Patent and Trademark Office, "Notice of Allowance," issued in connection with U.S. Appl. No. 13/693,694, dated May 15, 2015, 28 pages.
United Kingdom Intellectual Property Office, "Combined Search and Examination Report," issued in connection with GB Patent Application No. GB1316482.7, dated Apr. 4, 2014, 4 pages.
Maine et al., "Design of a Hybrid Chemical/Electric Propulsion Orbital Transfer Vehicle," Journal of Spacecraft and Rockets, vol. 39, No. 1, pp. 131-139, Jan. 2002, 9 pages.
United States Patent and Trademark Office, "Non-final Office Action," issued in connection with U.S. Appl. No. 14/828,462, dated Jul. 26, 2016, 41 pages.
United States Patent and Trademark Office, "Notice of Allowance," issued in connection with U.S. Appl. No. 14/828,462, dated Jan. 11, 2017, 18 pages.
Canadian Intellectual Property Office, "Office Action," issued in connection with Canadian Patent Application No. 2,831,309, dated May 13, 2016, 3 pages.
Canadian Intellectual Property Office, "Office Action," issued in connection with Canadian Patent Application No. 2,831,309, dated Jan. 15, 2015, 4 pages.
State Intellectual Property Office of China, "Notification of Secon Office Action," issued in connection with Chinese Application No. 2013106477607, dated Jul. 12, 2017, 24 pages.
European Patent Office, "Extended European Search Report," issued in connection with EP Application No. 13194767.3, dated Nov. 24, 2017, 8 pages.
Japanese Patent Office, "Notice of Reasons for Rejection," issued in connection with JP Application No. 2013-249017, dated Dec. 5, 2017, 7 pages.
State Intellectual Property Office of China, "Notification of the Decision of Rejection," issued in connection with Chinese Application No. 2013106477607, dated Jan. 19, 2018, 20 pages.
United States Patent and Trademark Office, "Non-final Office Action," issued in connection with U.S. Appl. No. 15/477,923, dated Jun. 16, 2017, 12 pages.
United States Patent and Trademark Office, "Final Office Action," issued in connection with U.S. Appl. No. 15/477,923, dated Oct. 30, 2017, 14 pages.
United States Patent and Trademark Office, "Advisory Action," issued in connection with U.S. Appl. No. 15/477,923, dated Dec. 29, 2017, 17 pages.
United States Patent and Trademark Office, "Notice of Allowance," issued in connection with U.S. Appl. No. 15/477,923, dated Mar. 21, 2018, 7 pages.
United States Patent and Trademark Office, "Notice of Allowance," issued in connection with U.S. Appl. No. 15/477,923, dated Apr. 9, 2018, 2 pages.
United States Patent and Trademark Office, "Notice of Allowance," issued in connection with U.S. Appl. No. 15/477,923, dated Apr. 25, 2018, 6 pages.
United States Patent and Trademark Office, "Notice of Allowance," issued in connection with U.S. Appl. No. 15/477,923, dated May 10, 2018, 9 pages.
United States Patent and Trademark Office, "Notice of Allowance," issued in connection with U.S. Appl. No. 15/477,923, dated Jul. 25, 2018, 3 pages.
Japanese Patent Office, "Decision of Rejection," issued in connection with application No. 2013249017, dated Sep. 4, 2018, 7 pages.
European Patent Office, "Office Action," dated May 3, 2019, in connection with European Patent Application No. 13194767.3 (6 pages).
State Intellectual Property Office of the People's Republic of China, "First Office Action," dated Nov. 16, 2016 in connection with Chinese Patent Application No. 2013106477607, 27 pages.
State Intellectual Property Office of the People'S Republic of China, "Third Office Action," dated Jul. 26, 2019 in connection with Chinese Patent Application No. 2013106477607, 6 pages.
United States Patent and Trademark Office, "Notice of Allowance," dated Jun. 5, 2019 in connection with U.S. Appl. No. 15/477,923, 5 pages.
United States Patent and Trademark Office, "Notice of Allowance," dated Sep. 10, 2019 in mnnection with U.S. Appl. No. 15/477,923, 5 pages.
Japanese Patent Office, "Notice of Reasons for Rejection," issued in connection with application No. 2013-249017, dated Oct. 29, 2019, 13 pages.
Japanese Patent Office, "Notice of Reasons for Rejection," dated Feb. 25, 2020, in connection with Japanese Patent Application No. 2019-000258, 11 pages.
Stephen Clark, "Electric propulsion could launch new commercial trend," Spaceflight Now, Mar. 19, 2012 (6 pages).
D.M. Goebel M. Martinez-Lavin, T.A. Bond, A.M. King, "Performance of XIPS Electric Propulsion in On-orbit Station Keeping of the Boeing 702 Spacecraft." 38th AIAA/ASME/SAE/ASEE Joint Propulsion Conference & Exhibit, Jul. 7-10, 2002, Indianapolis, Indiana (6 pages).
Japanese Patent Office, "Notice of Reasons for Rejection," dated Mar. 3, 2020, in connection with Japanese Jatent Application No. 2013-249017, 40 pages.
United States Patent and Trademark Office, "Supplemental Notice of Allowance," dated Apr. 22, 2020 in connection with U.S. Appl. No. 16/127,973, 2 pages.
United States Patent and Trademark Office, "Supplemental Notice of Allowance," dated Apr. 3, 2020 in connection with U.S. Appl. No. 16/127,973, 2 pages.
United States Patent and Trademark Office, "Notice of Allowance," dated Feb. 18, 2020 in connection with U.S. Appl. No. 16/127,973, 8 pages.
United States Patent and Trademark Office, "Non-Final Office Action," dated May 30, 2019 in connection with U.S. Appl. No. 16/127,973, 14 pages.
United States Patent and Trademark Office, "Non-Final Office Action," dated Oct. 23, 2018 in connection with U.S. Appl. No. 16/127,973, 13 pages.
United States Patent and Trademark Office, "Final Office Action," dated Nov. 25, 2019 in connection with U.S. Appl. No. 16/127,973, 15 pages.
United States Patent and Trademark Office, "Final Office Action," dated Mar. 28, 2019 in connection with U.S. Appl. No. 16/127,973, 14 pages.
European Patent Office, "Communication pursuant to Article 94(3) EPC", issued in connection with European Patent Application No. 13194767.3, dated Mar. 17, 2021, (6 pages).
National Intellectual Property Administration, PRC, "First Office Action and Search Report", issued in connection with Chinese Patent Application No. 2018104861031, dated Dec. 17, 2020, (15 pages).
Japanese Patent and Trademark Office, "Notice of Reasons for Rejection", issued in connection with JP Patent Application No. 2019-000258, dated Sep. 29, 2020, (11 pages).
European Patent Office, "Communication pursuant to Article 94(3) EPC", issued in connection with European Patent Application No. 13194767.3, dated Jul. 14, 2020, (5 pages).
Reshetnev Company, "Communications on a global scale,' Information Satellite Systems, Journal-10-2010", 2010 (32 pages).
Reshetnev Company, "JSC ISS Corporate Presentation," Apr. 22-23, 2010 (30 pages).
Gilles, "AMOS 5 et Loutch 5A lances avec succes par Proton M Breeze M", Dec. 14, 2011, article extracted from the Internet site of

(56) References Cited

OTHER PUBLICATIONS

'Association amicale des anciens de l'activite spatiale' with English translation, 4AS Alcatel Alenia Thales, available online: http://4aspace.online.fr/spip/imprimer.php?id_article=364 (2 pages).
Gilles, "AMOS 5 et LOUTCH 5A lances avec succes par Proton M Breeze M", Dec. 14, 2011, enlarged photo extracted from the Internet site of 'Association amicale des anciens de l'activite spatiale' 4AS Alcatel Alenia Thales, available online: http://4aspace.online.fr/spip/imprimer.php?id_article=364 (1 page).
Justin Ray, "Two satellites share one rocket launch into orbit," SpaceFlight Now, Dec. 11, 2011; available online https://spaceflightnow.com/proton/amos5luch5a/ (3 pages).
Luch Satellite, extract from the Internet site www.russianspaceweb.com, Dec. 10, 2011, available online:http://www.russianspaceweb.com/luch5a.html (6 pages).
Reshetnev Company, "50 years on Earth and space, Information Satellite Systems," Journal N°8, 2009, 2009 (32 pages).
"Proton Launch System Mission Planner's Guide, Section 4, Space Vehicle Interfaces", Jul. 2009 (38 pages).
Raumfahrer, "Luch 5A und AMOS 5 auf Proton M Bris-M, forum, www.raumfahrer.net", Nov. 30, 2011, available online:https://www.raumfahrer.net/forum/smf/index.php?topic=9864.0 (20 pages).
W. M. Folkner et al., "LISA :Mission Concept Study. Laser interferometer Space Antenna For the Detection and Observation of Gravitational Waves," JPL publication 97-16, Mar. 2, 1998 (91 pages).
Rudy Lukez, "The use of graphite/epoxy composite structures in space applications" Morton Thiokol, Inc., Aerospace Group Brigham City, Utah, 1987 (11 pages).
Digital Commons, "Small Satellite Conference" All 1978 Contents Schedule, 1987, last retrieved Jan. 27, 2021, available online: https://digitalcommons.usu.edu/smallsat/1987/alli 987/ (6 pages).
'Wikipedia, "Polymere renforce de fibres de carbones" version of Feb. 7, 2012, available online: https://fr.wikipedia.org/w/index.php?title=Polym%C3%A8re renforc%C3%A9 de fibres de carbone &oldid=75262512 (6 pages).
Chuck Lazansky, "Refinement of a Low-Shock Separation System," Proceedings of the 41st Aerospace Mechanism Symposium (AMS), Jet Propulsion Laboratory, May 16-18, 2012 , proceedings made available to the public on Jun. 6, 2012 (15 pages).
Nasa Jet propulsion Laboratory—California institute of technology—Beacon Library, archive and records: proof of date of availability to the public of the proceedings of 41st AMS download page of these proceedings avialable online: https://trs.jpl.nasa.gov/handle/2014/42161?show=full (3 pages).
Wikipedia, "Marman Clamp", Apr. 14, 2012, available online:https://en.wikipedia.org/w/index.php? title=Marman_clamp&direction=prev &oldid=492029464 (1 page).
LISA, "Laser interferometer Space Antenna: A Cornerstone Mission for the Observation of Gravitational Waves," System and Technology Study Report, Jul. 2000 (342 pages).
NASA Spaceflight Forums, "Proton-M Launch with Lunch-5A and AMOS-5," Dec. 11, 2011, available online: forum.nasaspaceflight.com/index.php?topic=27248.060 (14 pages).
European Patent Office, "Opposition," issued in connection with European Patent Application No. 2662287, dated Jan. 28, 2021 (72 pages).
Japanese Patent Office, "Decision of Rejection," issued in connection with Japanese Patent Application No. 2019-000258, dated Jun. 22, 2021 (5 pages).
European Patent Office, "Extended European Search Report," issued in connection with European Appl. No. 19185335.7, dated Nov. 17, 2021, 12 pages.
Japanese Patent Office, "Notice of Reasons for Rejection," issued in connection with Japanese Patent Application No. 2020-147995, dated Oct. 12, 2021 (10 pages).

\* cited by examiner

# MULTIPLE SPACE VEHICLE LAUNCH SYSTEM

RELATED APPLICATIONS

This application claims the benefit of U.S. application Ser. No. 14/925,152, filed on Oct. 28, 2015, which claims the benefit of U.S. application Ser. No. 14/486,103, filed on Sep. 15, 2014, which claims the benefit of U.S. application Ser. No. 13/604,050, filed on Sep. 5, 2012, which claims the benefit of U.S. Provisional Application No. 61/646,222, filed on May 11, 2012. U.S. patent application Ser. No. 14/925, 152, U.S. patent application Ser. No. 14/486,103, U.S. patent application Ser. No. 13/604,050, and U.S. Provisional Application No. 61/646,222 are hereby incorporated by reference in their entireties.

BACKGROUND

The present disclosure is directed to space vehicle launch systems and, more particularly, to space vehicle launch systems for launching multiple payloads.

Typical launch vehicles are very expensive. Further, each kilogram of payload that is to be launched into Earth orbit may require as much as ten kilograms of fuel. Accordingly, it may be desirable to minimize payload mass in order to reduce overall cost and fuel requirements. One mechanism for reducing payload mass may be to eliminate any unnecessary structure from the payload.

As a result of such cost concerns, it may be desirable to launch two or more discrete payloads with a single launch vehicle. Such multiple payloads may be in the form of space vehicles, such as satellites. Typically, such satellites themselves may require and incorporate chemical rocket motors to increase orbital altitude and to make altitude adjustments once the desired orbital altitude is achieved.

Such chemically powered space vehicles are relatively heavy. Due to space constraints within the payload region of the fairing, it is often necessary to orient such space vehicles in a linear or stacked column that may extend along a central longitudinal axis of the launch vehicle. When such a launch vehicle is on a launch pad, and after lift-off, the orientation of such space vehicles is substantially vertical.

As a result, the weight, or gravitational force of the mass, of an upper space vehicle may bear down upon a lower space vehicle in such a vertical configuration. When the launch vehicle lifts off the launch pad, this gravitational force is multiplied as a result of the acceleration of the launch vehicle into Earth orbit. Because of the mass of the space vehicles, especially if equipped with chemical rocket motors, the lower space vehicle may not be able to withstand the gravitational force and launch load of the upper space vehicle. Accordingly, a support structure is required.

One example of such support structure is a dual-launch structure denoted in French as Systeme de Lancement Double Ariane (Sylda), or in English this is known as a Double Ariane Launch System, as employed on the Ariane 4 and Ariane 5 rockets. A Sylda may be made of carbon fiber and be in the form of a hollow structure that encloses the lower space vehicle and engages and supports the upper space vehicle. Gravitational forces and launch loads may be transmitted from the upper space vehicle, to the Sylda, and from the Sylda to the support base of the fairing. Thus, the lower space vehicle does not have to support the mass and launch load of the upper space vehicle.

A disadvantage of such an arrangement may be that the use of a Sylda adds to the overall payload mass, which may increase the fuel requirement and/or reduce the available size of a payload that is to be launched into orbit by a given launch vehicle. Accordingly, there is a need for a multiple space vehicle launch system that minimizes or eliminates the need for such support structure.

SUMMARY

The present disclosure is directed to a multiple space vehicle launch system that may include a first space vehicle, and a second space vehicle releasably attached to the first space vehicle and oriented relative to the first space vehicle such that, when placed within a fairing, a launch load from the first space vehicle is transmitted to and borne by the second space vehicle, thereby eliminating the need for Sylda or other reinforcing or support structure. In an embodiment, the first and second space vehicles each may include one of an electrical propulsion motor and a hybrid chemical and electrical propulsion motor. By utilizing electrical propulsion motors in the space vehicles, the total mass of the space vehicle may be significantly reduced when compared to a space vehicle having a chemical propulsion motor, which may enable support structures such as Sylda to be eliminated.

According to an embodiment, a method of manufacturing a space vehicle system is disclosed. The method comprises disposing a first space vehicle having an upper core structure upon a second space vehicle having a lower core structure such that loads of the first space vehicle may be transmitted to the lower core structure of the second space vehicle.

In another embodiment, a method of assembling a space vehicle system is disclosed. The method comprises disposing a first space vehicle having an upper core structure upon a second space vehicle having a lower core structure such that loads of the first space vehicle may be transmitted to the lower core structure of the second space vehicle. The method further comprises disposing the first space vehicle and the second space vehicle into a payload region of a launch vehicle.

In yet another embodiment, a space vehicle system is disclosed. The space vehicle system may include a first space vehicle having an upper core structure and a second space vehicle having a lower core structure. The first space vehicle is disposed upon the second space vehicle such that loads of the first space vehicle may be transmitted to the lower core structure of the second space vehicle.

In another embodiment, a method of launching a space vehicle system is disclosed. The space vehicle system may include a first space vehicle having an upper core structure disposed upon a second space vehicle having a lower core structure. The method comprises causing loads associated with the first space vehicle to be transmitted to and borne by the lower core structure of the second space vehicle. The method further comprises launching the first space vehicle and the second space vehicle.

In yet another embodiment, a space vehicle system is disclosed. The space vehicle system may include a first space vehicle having an upper core structure and a second space vehicle having a lower core structure. The first space vehicle is disposed upon the second space vehicle prior to deployment of the space vehicle system such that loads of the first space vehicle may be transmitted to the lower core structure of the second space vehicle. The first space vehicle and the second space vehicle may be separated from one another during the deployment of the space vehicle system.

In the embodiments described above and others, the use of traditional inter-launch vehicle fairing, Sylda, and interfairing separation systems may be eliminated. This reduces the non-revenue generating payload mass and may reserve more available mass for revenue generating payload. Other objects and advantages will be apparent from the following description, the accompanying drawings and the appended claims.

DETAILED DESCRIPTION

Figure 1:
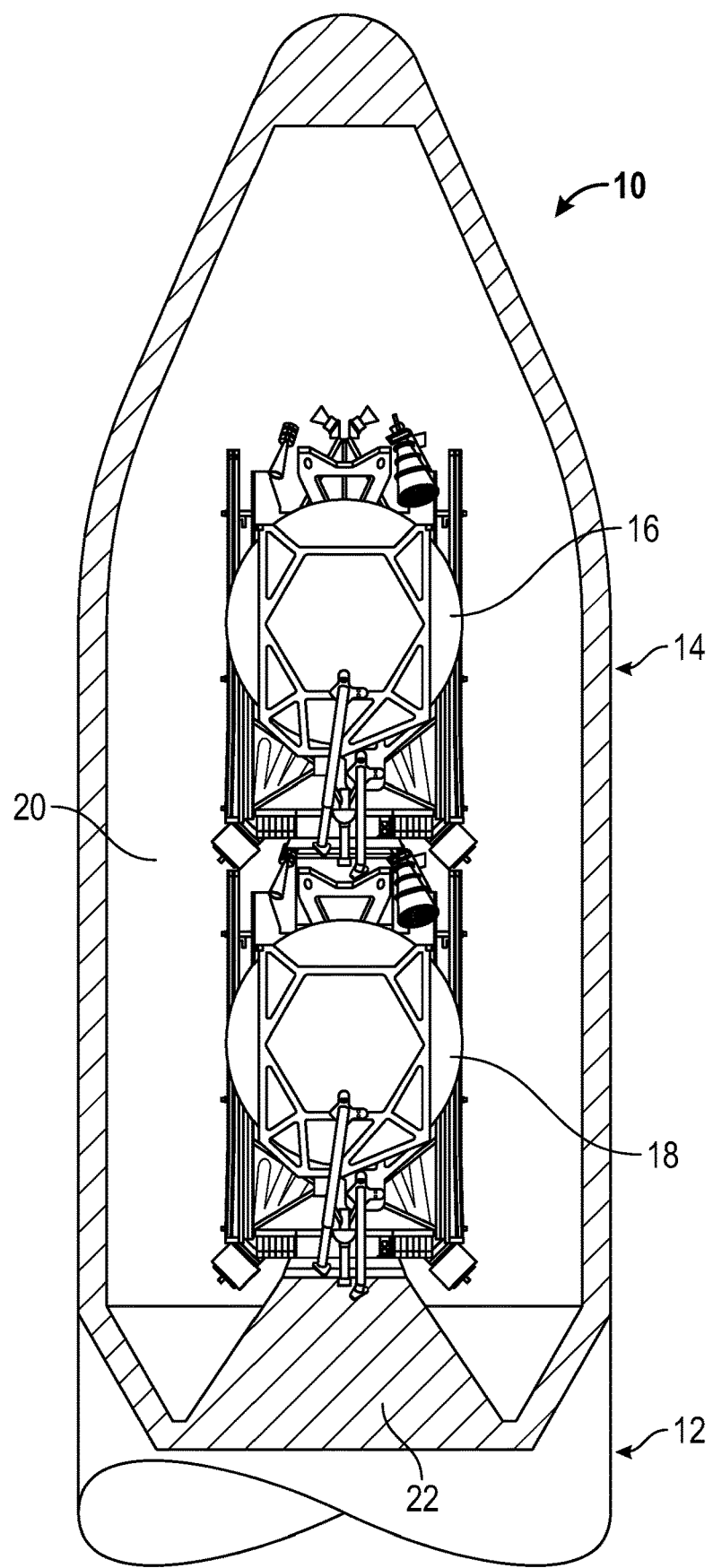
FIG. 1 is a schematic, side elevation in section of an embodiment of the multiple space vehicle launch system of the present disclosure.

As shown in FIG. 1, the multiple space vehicle launch system, generally designated 10, is used with a launch vehicle 12 having a fairing 14. The system 10 may include a first or upper space vehicle, generally designated 16, and a second or lower space vehicle, generally designated 18. The space vehicles are positioned within a payload region 20 of the fairing 14. It should be noted that, although FIG. 1 shows a space vehicle launch system 10 having two space vehicles 16, 18, it is within the scope of the disclosure to provide a space vehicle launch system having three or more space vehicles.

Regardless of the number of space vehicles 16, 18 employed in the launch system, the arrangement of space vehicles within the fairing 14 may be in a stacked, vertical configuration as shown in FIG. 1. The term "vertical" as used herein refers to the orientation of the stacked space vehicles 16, 18 relative to a launch pad (not shown) supporting the launch vehicle 12 when the launch vehicle is oriented in a vertical position, or a vertically stacked manner, relative to the Earth. In an embodiment, the stacked space vehicles 16, 18 may be aligned with, and may coincide with, a central longitudinal axis of the fairing 14 and/or launch vehicle 12. The lower space vehicle 18 may rest upon a base 22 that may be a part of the fairing 14.

Figure 2:
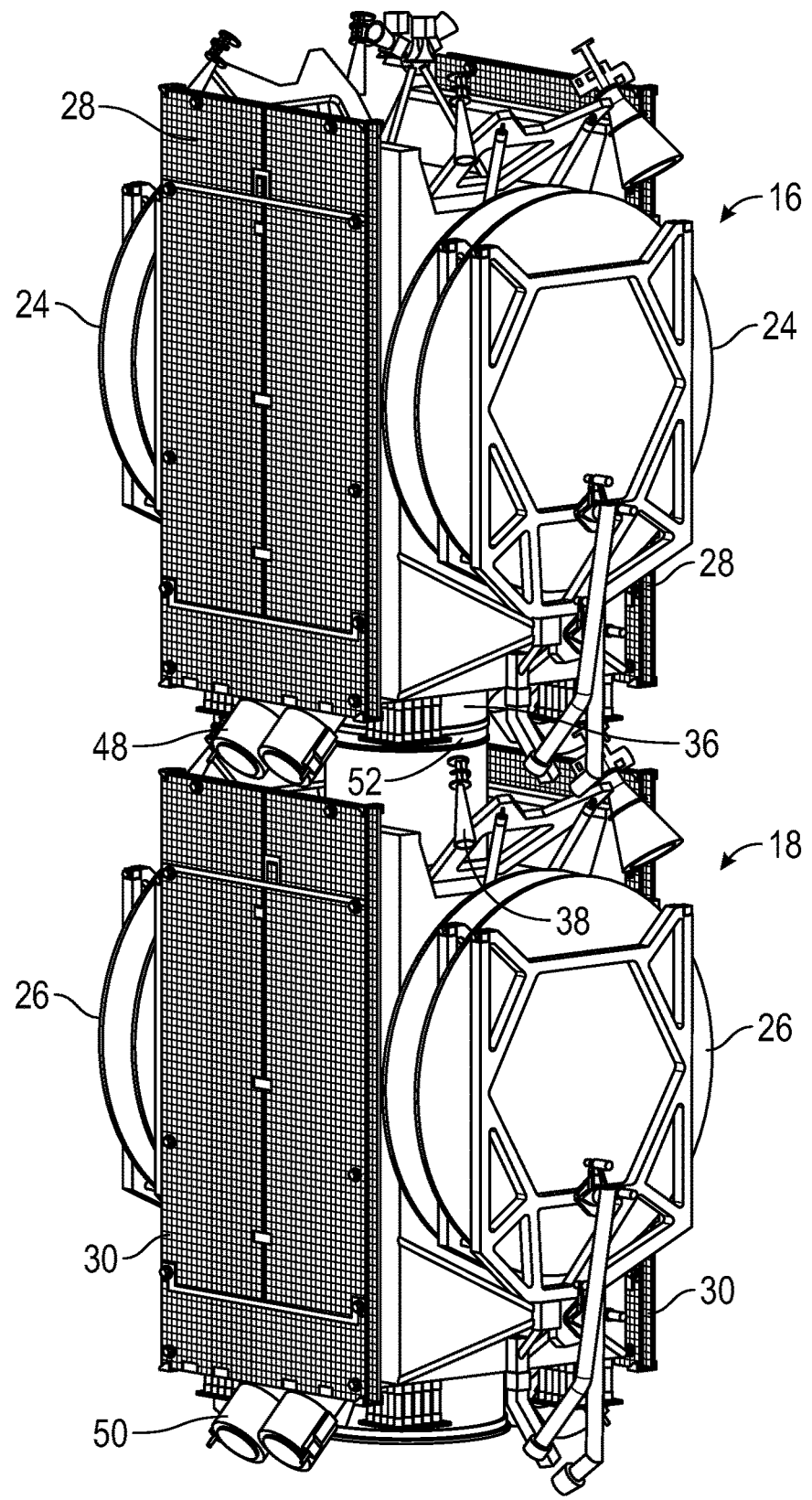
FIG. 2 is a schematic, perspective view of two space vehicles depicted in FIG. 1.
Figure 3:
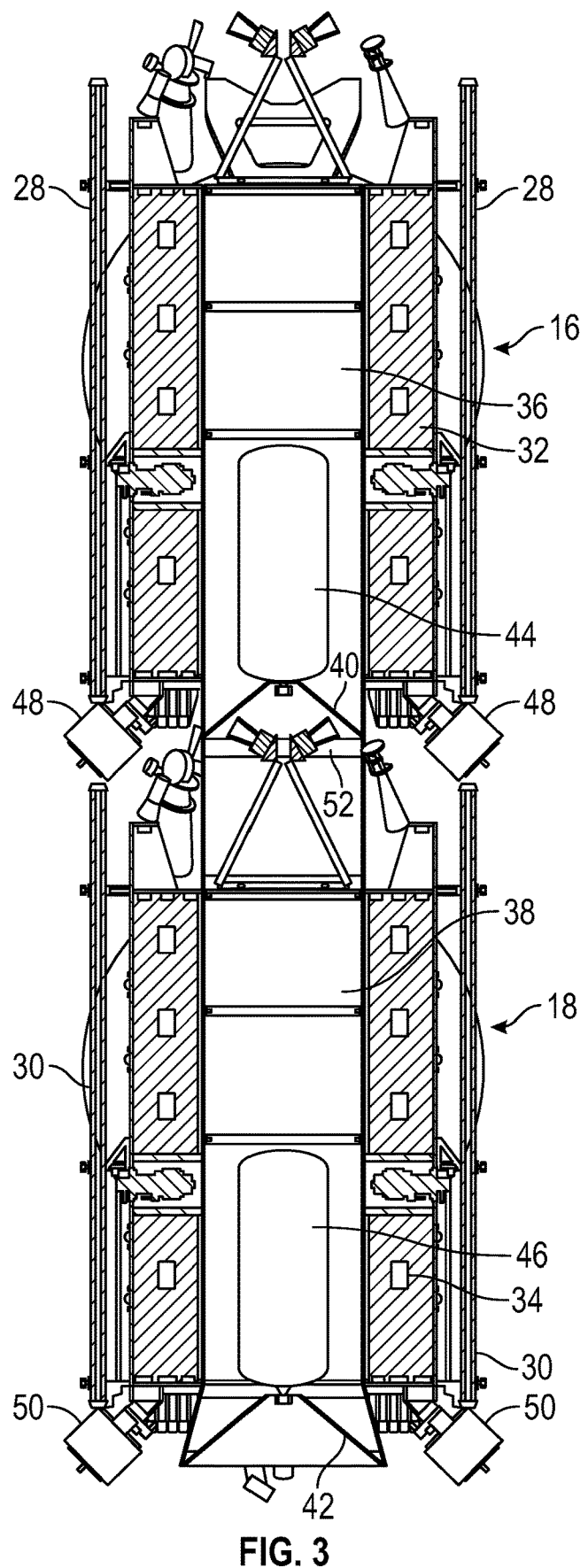
FIG. 3 is a schematic, side elevation in section of the space vehicles depicted in FIG. 1.

As shown in FIGS. 2 and 3, the space vehicles 16, 18 may be satellites. In various embodiments, the space vehicles 16, 18 may be geosynchronous satellites, interplanetary probes, combinations thereof, or any type of space vehicle having a propulsion system that is launched by a launch vehicle 12 (FIG. 1).

The space vehicles 16, 18 may include antenna reflectors 24, 26, respectively, and deployable solar arrays 28, 30, respectively. As best shown in FIG. 3, the space vehicles 16, 18 may include shear load panels 32, 34 that are mounted on core structures 36, 38, respectively.

The core structures 36, 38 may be cylindrical in shape and hollow. Core structures may be of other shapes and not depart from the scope of this disclosure. Core structure 36 may be made of a strong, light material such as graphite, and in one embodiment have a wall thickness of 0.09". Core structure 38 also may be made of a strong, light material such as graphite, and in one embodiment have a wall thickness of 0.45". The shear panels 32, 34 may support the solar arrays 28, 30 of the space vehicles 16, 18, respectively.

In the embodiment shown in FIGS. 2 and 3, the space vehicles 16, 18 each may include an electric propulsion unit such as an electric propulsion motor, generally designated 40, 42, respectively. Electric propulsion motors 40, 42 may consist of an ion/plasma motor that utilizes Xenon gas as a propellant that is stored in tanks 44, 46 that may be positioned within core structures 36, 38, respectively. The electric propulsion motors 40, 42 also may include exhaust nozzles 48, 50, respectively.

In the embodiment shown in FIGS. 2 and 3, the space vehicles 16, 18 each may include a single electric propulsion motor 40, 42 that may constitute the sole source of propulsion and navigation for that space vehicle; no other propulsion source may be included. The components 40, 42 of space vehicles 16, 18 also may represent other types of electric propulsion motors, as well as hybrid electric/chemical propulsion units such as hybrid electric/chemical propulsion motors. It is also within the scope of the disclosure to provide space vehicle 16 with an electric propulsion motor 40 and provide space vehicle 18 with a hybrid electric/chemical propulsion motor 42. Use of electric propulsion motors 40, 42, or hybrid electric/chemical propulsion motors may be advantageous because they reduce the overall mass of the space vehicles 16, 18 in comparison to chemical propulsion motors.

In one embodiment, the upper space vehicle 16 may be connected to the lower space vehicle 18 by a pre-tensioned release band 52 that connects the core structure 36 of the upper vehicle with the core structure 38 of the lower vehicle. As shown in the figures, the core structure 38 of the lower vehicle 18 may extend upwardly above the upper edge of the solar arrays 30 of the lower vehicle to engage the core structure 36 which, in the embodiment shown, may not extend beyond the lower edge of the solar arrays 28 of the upper space vehicle.

In operation, the upper and lower space vehicles 16, 18, respectively, first may be attached to each other by the pre-tensioned release band 52. The combined space vehicles 16, 18 may be placed within the fairing 14 of a launch vehicle 12, as shown in FIG. 1, so that the lower space vehicle rests upon the base 22 of the fairing.

When the launch vehicle is standing on the launch pad (not shown), the launch vehicle 12, fairing 14 and space vehicles 16, 18 may be oriented vertically relative to the Earth. In this configuration, the downward gravitational force of the upper space vehicle 16 may be transmitted to and borne entirely by the lower space vehicle 18. In the embodiment shown, this gravitational force may be transmitted entirely from the core structure 36 of the upper space vehicle 16 to the core structure 38 of the lower space vehicle 18.

During liftoff of the launch vehicle 12, the acceleration forces of the upper space vehicle 16 likewise may be transmitted through the core structure 36 to the core structure 38 of the lower space vehicle 18. In the embodiment shown, the upper and lower space vehicles 16, 18 may be linearly and vertically aligned in a vertically stacked configuration so that the gravitational and launch loads of the upper space vehicle 16 are efficiently transmitted to and borne entirely by the lower space vehicle 18.

In conclusion, two configuration features of the disclosed space vehicle launch system combine to provide a reduction in overall launch system mass. First, the individual space vehicles do not use conventional chemical propellant, but instead use electric propulsion, in one embodiment, which has a higher efficiency and thus requires significantly less propellant mass. In another embodiment, the space vehicles may use a hybrid electric/chemical propulsion motor. Second, the space vehicles may be stacked, one on top of the other, so that the launch loads from the upper space vehicle may pass through the lower space vehicle.

The upper and lower space vehicles may include a compatible mounting structure for releasably mounting adjacent spacecraft. This structure may eliminate the need for an inner fairing structure or a fairing separation system, which otherwise might be necessary for multiple manifested spacecraft. The disclosed vehicle launch system may eliminate a significant amount of mass that is not required to fulfill the primary spacecraft mission, which allows more available mass for revenue-generating payload. Further, minimizing propellant mass and non-functional structure mass from the launch vehicle optimizes the overall system mass.

While the forms of apparatus and methods herein described constitute preferred embodiments of this invention, it is to be understood that the invention is not limited to these precise forms of apparatus and methods, and that changes may be made therein without departing from the scope of the invention.

What is claimed is:

1. A space vehicle system, comprising:
   a first space vehicle including a first core structure having a first wall thickness;
   a second space vehicle including a second core structure having a second wall thickness more than twice the first wall thickness, the second core structure releasably attached to the first space vehicle in a stacked configuration, at least one of the first core structure or the second core structure made of graphite;
   a first solar array supported by the first core structure, the first core structure having a first end and a second end, the first end extending below a first upper edge of the first solar array, the second end extending beyond a lower edge of the first solar array; and
   a second solar array supported by the second core structure, the second core structure extending beyond a second upper edge of the second solar array.

2. The space vehicle system of claim 1, wherein the first core structure and the second core structure are hollow cylindrical structures.

3. The space vehicle system of claim 1, further including a fairing shaped to enclose the first and the second space vehicles, the fairing including a base shaped to support the second space vehicle.

4. The space vehicle system of claim 1, wherein the second space vehicle is attached to the first space vehicle such that a launch load from the first space vehicle is transmitted entirely to, and borne entirely by, the second space vehicle through the first core structure and the second core structure.

5. The space vehicle system of claim 1, wherein the first space vehicle includes a first electric propulsion unit including a first electric propulsion motor and the second space vehicle includes a second electric propulsion unit including a second electric propulsion motor, the first electric propulsion motor constitutes the sole source of propulsion for the first space vehicle and the second electric propulsion motor constitutes the sole source of propulsion for the second space vehicle.

6. The space vehicle system of claim 5, wherein at least one of the first electric propulsion unit or the second electric propulsion unit is an ion/plasma propulsion unit.

7. The space vehicle system of claim 1, wherein the second core structure is releasably attached to the first space vehicle with a release band.

8. The space vehicle system of claim 1, wherein the first space vehicle includes a first propulsion unit and a first tank to store first propellant for the first propulsion unit and the second space vehicle includes a second propulsion unit and a second tank to store second propellant for the second propulsion unit.

9. The space vehicle system of claim 8, wherein the first core structure includes the first tank and the second core structure includes the second tank.

10. A method of manufacturing a multiple space vehicle launch system, the method comprising:
    attaching a first core structure of a first space vehicle to a second core structure of a second space vehicle along a central longitudinal axis of a launch vehicle, the first core structure having a first wall thickness, the second core structure having a second wall thickness more than twice the first wall thickness, at least one of the first core structure or the second core structure made of graphite;
    mounting a first solar array on the first core structure, the first core structure extending below an upper edge of the first solar array and beyond a lower edge of the first solar array;
    mounting a second solar array on the second core structure; and
    disposing the first core structure and the second core structure in a fairing of the launch vehicle such that the second core structure rests upon a base of the launch vehicle.

11. The method of claim 10, wherein the first core structure is releasably attached to the second core structure with a release band.

12. The method of claim 10, wherein disposing the first core structure and the second core structure includes orienting the first core structure and the second core structure in a stacked configuration within a payload region of the fairing.

13. The method of claim 12, wherein the stacked configuration is a vertically stacked configuration, a launch load of the first space vehicle is transmitted to and borne by the second space vehicle by orienting the first core structure and the second core structure in the vertically stacked configuration.

14. The method of claim 10, wherein mounting the first solar array and the second solar array includes:
    mounting a first shear load panel on the first core structure;
    supporting the first solar array on the first shear load panel;
    mounting a second shear load panel on the second core structure; and
    supporting the second solar array on the second shear load panel.

15. The method of claim 10, wherein the upper edge is a first upper edge, the second solar array defines a second upper edge, the second core structure extends upwardly above the second upper edge of the second solar array to engage the first core structure.

16. A method to transmit a launch load between space vehicles during a launch, the method comprising:
    initiating a liftoff of a launch vehicle, the launch vehicle including:
        a first space vehicle including a first core structure and a first solar array, the first core structure having a first wall thickness, the first solar array coupled to the first core structure, the first core structure extending below an upper edge of the first solar array and beyond a lower edge of the first solar array; and
        a second space vehicle attached to the first space vehicle in a stacked configuration, the second space vehicle including a second core structure having a second wall thickness more than twice the first wall thickness, at least one of the first core structure or the second core structure made of graphite, the first space vehicle and the second space vehicle disposed upon a base of a fairing of the launch vehicle; and in response to the initiation of the liftoff, transmitting a launch load of the first space vehicle to the second space vehicle.

17. The method of claim 16, wherein the launch load is borne by the second space vehicle during the liftoff.

18. The method of claim 16, wherein attaching the first space vehicle to the second space vehicle includes attaching the first core structure to the second core structure of the second space vehicle.

19. The method of claim 18, wherein the first core structure and the second core structure are attached such that forces associated with the launch load of the first space vehicle is transmitted to the second core structure.

20. The method of claim 18, wherein forces from the first core structure are transmitted to the second core structure during the liftoff.

21. A method, comprising:

disposing a first space vehicle including an upper core structure upon a second space vehicle including a lower core structure in a stacked configuration in a launch vehicle, the upper core structure releasably attached to the lower core structure via a release band, the upper core structure having a first wall thickness, the lower core structure having a second wall thickness more than the first wall thickness, at least one of the lower core structure or the upper core structure made of graphite;

mounting a first solar array on the upper core structure, the upper core structure extending below a first upper edge of the first solar array and past a lower edge of the first solar array; and mounting a second solar array on the lower core structure, the lower core structure extending upwardly above a second upper edge of the second solar array to engage the upper core structure.

22. The method of claim 21, wherein the first space vehicle and the second space vehicle are disposed in a fairing of the launch vehicle.

23. The method of claim 21, wherein mounting the first solar array and the second solar array includes:

mounting a first shear load panel on the upper core structure and mounting the first solar array on the first shear load panel; and mounting a second shear load panel on the lower core structure and mounting the second solar array on the second shear load panel.

24. The method of claim 21, wherein the lower edge is a first lower edge, and the lower core structure extends below a second lower edge of the second solar array.

25. The space vehicle system of claim 1, wherein at least one of the first space vehicle or the second space vehicle is a geosynchronous satellite or an interplanetary probe.

26. The space vehicle system of claim 1, wherein the first wall thickness is uniform throughout the first core structure and the second wall thickness is uniform throughout the second core structure.

27. The space vehicle system of claim 1, wherein the first wall thickness and the second wall thickness are based on the stacked configuration.

28. The method of claim 21, wherein at least one of the first space vehicle or the second space vehicle is a geosynchronous satellite or an interplanetary probe.

* * * * *